F. HENDLER.
SELF LOCKING DRIVE GEAR.
APPLICATION FILED MAR. 9, 1908.
922,138. Patented May 18, 1909.
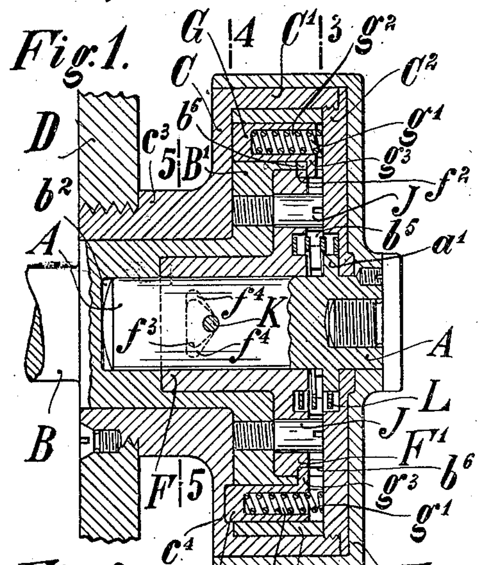
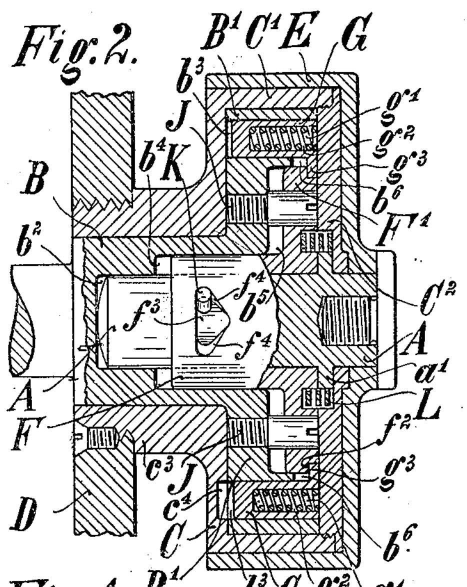
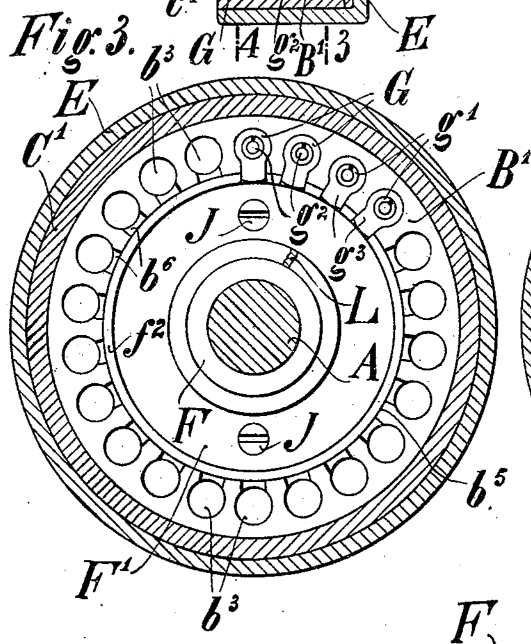
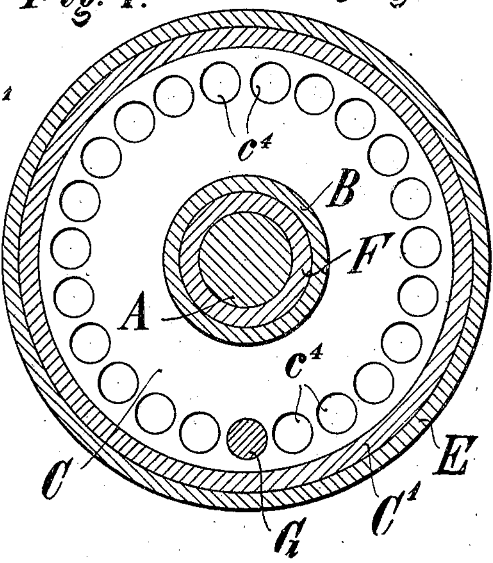
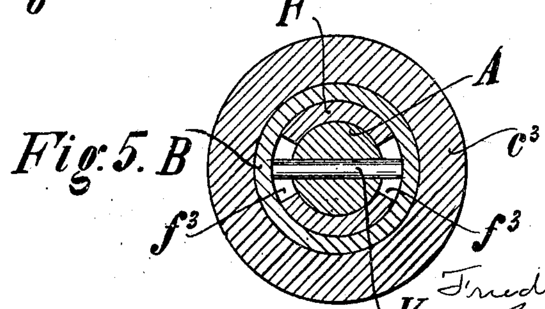
Witnesses
J. M. Wynkoop,
L. R. Nevitt.
Inventor,
Friedrich Hendler
By Knight Bros attys
THE NORRIS PETERS CO., WASHINGTON, D. C.

UNITED STATES PATENT OFFICE.

FRIEDRICH HENDLER, OF ESSEN-ON-THE-RUHR, GERMANY, ASSIGNOR TO FRIED. KRUPP AKTIENGESELLSCHAFT, OF ESSEN-ON-THE-RUHR, GERMANY.

SELF-LOCKING DRIVE-GEAR.

No. 922,138. Specification of Letters Patent. Patented May 18, 1909.

Application filed March 9, 1908. Serial No. 419,989.

*To all whom it may concern:*

Be it known that I, FRIEDRICH HENDLER, a subject of the Emperor of Germany, and a resident of Essen-on-the-Ruhr, Germany, have invented certain new and useful Improvements in Self-Locking Drive-Gears, of which the following is a specification.

This invention relates to drive-gears provided with automatic double-acting locking devices for the driven member, which locking devices are released by the act of applying power through the driving member.

According to the present invention, the securing or locking means comprises a bolt clutch with a large number of bolts and with seats different in number from the bolts.

In the accompanying drawings, which show one embodiment of the invention by way of illustration, Figure 1 is an axial longitudinal section of the drive-gear with engaged locking device; Fig. 2 is a view corresponding to Fig. 1, with disengaged locking device; Figs. 3 and 4 are sections taken respectively on the lines 3—3 and 4—4 of Fig. 1, seen from the left; Fig. 5 is a section on the line 5—5 of Fig. 1, seen from the left.

A is the driving shaft and B the driven shaft of the drive-gear. The shaft B has bearing in an extension $c^3$ from the base C of a cylindrical housing C $C^1$ $C^2$. This housing is rigidly secured upon a frame D, through the medium of its extension $c^3$. Mounted upon the shaft B is a disk $B^1$ which abuts against the inner face of the wall of the housing C $C^1$ $C^2$, so that the shaft B is secured against displacement. The shaft A is journaled co-axially with the shaft B, in a bore $b^2$ of the shaft B and in the cover $C^2$ of the housing C $C^1$ $C^2$; said shaft carries a cup-shaped grip wheel E which incloses a cylindrical wall $C^1$ of the housing C $C^1$ $C^2$ and covers the cover $C^2$ of the housing. The end of the shaft A which lies in the bore $b^2$ abuts against the base of said bore and thus prevents the shaft A from being displaced in one direction. The shoulder $a^1$ (Figs. 1 and 2) on the shaft A, for which a depression is provided in the housing cover $C^2$, secures the shaft A against displacement in the other direction.

In the disk $B^1$ are provided a number of bores $b^3$ (see particularly Fig. 3). In the particular design of drive-gear shown in the drawing, the number of these bores is 22. The locus of the axes of these bores $b^3$ is a cylinder whose axis coincides with the axis of the shafts A B. These bores $b^3$ are located at equal angular distances apart. In each bore $b^3$ is slidably mounted a cylindrical bolt G (Figs. 1 to 4). Each of the bolts G is under the influence of a spring $g^1$ arranged in a bore $g^2$ of the bolt and abutting at one end against the base of said bore and at the other end against the housing cover $C^2$. The springs $g^1$ consequently tend to press the bolts away from the base of the housing C. The latter is provided with a plurality of bores $c^4$ (Figs. 1, 2 and 4), the locus of whose axes is in the same cylinder as that of the axes of the bore $b^3$ of the disk $B^1$, or the axes of the bolts G. The bores $c^4$ can serve as seats for the bolts G, their diameters being slightly greater than the diameters of the bolts G. The number of seats $c^4$ in the particular design of drive-gear illustrated in the drawing, is 23. The distance between the seats $c^4$ is uniform.

From the foregoing explanation of the number and arrangement of the bolts G and the seats $c^4$ it follows that the distance between two adjacent bolts is slightly greater than the distance between the two adjacent seats. From this, and the fact that the diameter of the seats $c^4$ is slightly larger than the diameter of the bolts G, it follows that at every angular position which the disk $B^1$ may assume relatively to the housing C $C^1$ $C^2$, at least one of the bolts G can enter under the influence of its spring $g^1$, into engagement with one of the seats $c^4$. The proportions here presented are like the Vernier scale, the spacing of whose slide scale graduations are to a certain degree greater or less than the spacing of the graduations of the main scale. In the further explanation of the operation of the drive-gear it is assumed that the diameter of the seats $c^4$ is so determined that for each angular position of the disk $B^1$, only one of the bolts G can ever enter into a seat $c^4$. In the enlargement $b^4$ (Fig. 2) of the bore $b^2$ in the shaft B, for the shaft A and in a central depression $b^5$ of the disk $B^1$ is journaled a box F provided with a flange $F^1$, movable in an axial direction upon the shaft A. By the aid of this box, the bolts G can be disengaged from the seat $c^4$. For this purpose each bolt G carries a projection $g^3$ (see also Fig. 3) on that end which is toward the housing cover $C^2$, which projection is guided in a slot $b^6$ of the disk B and engages in a recess $f^2$ of the flange $F^1$. The box F is non-rotatably connected with the disk $B^1$ or shaft B, by two bolts J. These bolts are screwed into the disk $B^1$ and engage in bores of the flange $F^1$.

In the shaft A, and transverse to its axis, is inserted a bolt K (Figs. 1, 2 and 5) whose ends project beyond the shaft A and into two diametrically opposite openings of the box F. The openings $f^3$ are essentially in the form of an equilateral triangle whose base lies transverse to the axis of the shaft A. In the position of rest assumed by the block F in Fig. 1, the ends of the bolt K lie at the apex of the opening $f^3$. Consequently, if the shaft A is rotated in either direction, the coöperation of the bolt K with one of the inclined walls $f^4$ (Figs. 1 and 2) of the openings $f^3$, the box F will be displaced from its position of rest to the position shown in Fig. 2. For return of the box F to its position of rest, a spiral spring L is employed which is confined under compression between the flange $F^1$ of the box and the housing cover $C^2$.

In the position of rest the several parts of the drive-gear assume the position shown in Fig. 1. The flange $F^1$ of the box F lies at the base of the recess $b^5$. One of the bolts G stands in engagement with a seat $c^4$ so that the shaft B is prevented from turning in either direction, the play which the bolt may have in the seat being too slight to permit any perceptible turning of the shaft. The remaining bolts rest against the inter-rest spaces of the inner wall of the base C of the housing. If the shaft A is turned in either one direction or the other through the medium of the grip-wheel E, the box F will first be forced by the coöperation of bolt K with one of its walls $f^4$ of the opening $f^3$, into the position shown in Fig. 2, thereby further compressing the spring L. From the beginning of this displacement of the box F that one of the bolts G which stands in engagement with the seat $c^4$ will be picked up through its projection $c^3$, by the flange $F^1$ of the box F; that is to say, it will be withdrawn or disengaged from the seat $c^4$. Toward the end of said movement of the box F, the remaining bolts will be moved, so that in the position of the box shown in Fig. 2, none of the bolts will impinge against the inner wall of the base C of the housing. By this displacement of the bolts G, their springs $g^1$ will be compressed. When the ends of the bolt K reach the position in the openings $f^3$ of the box F shown in Fig. 2, the box F will be picked up through the medium of the bolt K by the shaft A. Through the medium of the bolts J, the rotation of the box F is followed by the disk $B^1$ and the latter is accompanied by the turning of the shaft B. The bolts G are thus held in disengaged position by means of the flange $F^1$ of the box F. If the grip wheel E is released, the box F, under the influence of its spring L, returns to its position of rest (Fig. 1) so that the bolts G are left to the influence of their springs $g^1$ and one of said bolts can enter into engagement with one of the seats $c^4$. As previously stated, such an engagement is practicable at every angular position which the disk $B^1$ can assume relatively to the housing C $C^1$ $C^2$. By the movement of the box F into this position of rest, the ends of the bolt K again slide along one of the walls $f^4$ of the openings $f^3$, so that the shaft A is turned backward to a slight degree. Consequently, the tension of the spring L must at least be sufficeint to overcome the friction due to the aforesaid movement of the box and the rotation of the shaft. Immediately after release of the grip wheel E, and the entrance of one of the bolts G into engagement with a seat $c^4$, shaft B is again locked against rotation in either direction.

The described drive-gear is distinguished from known arrangements of this kind employing a friction clutch for locking the driven member, by the greater certainty of driving, also by the fact that its interlocking faces are subjected to much less wear.

Having thus described the invention, the following is what I claim as new therein, and desire to secure by Letters Patent:

1. A drive-gear comprising driving and driven members and an automatic double-acting and drive-released locking device for the driven member; the locking device comprising a circular series of bolts, a member having a similar series of coöperating seats into which the bolts tend to enter, an axially-slidable bolt displacing member adapted to engage the bolts to hold them out of engagement with the seats, and a connection between the bolt-displacing member and the driving member through which said bolt-displacing member is moved in the direction to release the bolts from the seats when the driving member is turned in either direction.

2. In a drive-gear having automatic locking means for the driven member, the combination of the driving and driven members, one of which is adapted to drive the other through means which permits lost motion between the driving and driven members, the bolts mounted in circular series on the driven member, the fixed member having the series of seats arranged concentrically with said bolts, said bolts tending to enter said seats, and an axially-movable connection through which the said driving member holds the bolts out of engagement with the seats.

3. In a drive-gear, the combination with a fixed member provided with a series of seats, of the driving and driven members having lost motion between them, a series of bolts mounted upon the driven member and adapted to move into and out of engagement with said seats, a member movable axially relatively to the driven member, the cam connection between the driving member and the axially movable member through which the latter is moved by the driving member during the lost motion between the driving and driven members, and means through which said axially movable member engages the bolts to hold them out of engagement with the seats.

4. In an automatic self-locking and drive-released drive-gear, the combination of the casing provided with a series of seats, the driven member provided with a series of bolts adapted to enter said seats, a displacing box having driving connection with the driven member but axially movable relatively thereto and adapted to engage the bolts for holding them out of engagement with the seats, and a driving member having lost motion connection with the displacing box, constructed to impart the axial movement to the displacing box during said lost motion.

5. In a self-locking and drive-released drive-gear, the combination of the casing provided with a plurality of seats, the driven member, a disk carried by said driven member and fitted in said casing, a plurality of bolts differing in number from the seats, said bolts being mounted in the disk, and provided with springs tending to force them into the seats, bolts carried by the driven member through which the driving motion is imparted to it, a displacing box movable axially relatively to the driven member and having openings receiving the driving bolts through which the driven member may be rotated by the displacing box, a driving member having a lost motion connection with the displacing box, constructed to impart axial movement to said box during the lost motion, and a spring for returning the displacing box to its position of rest in which it releases the locking bolts.

6. In a self-locking drive-released drive-gear, the combination of the casing, constructed with a circular series of seats, a driven member, a disk carried by said driven member and rotatably fitted in said casing, a circular series of spring-pressed locking bolts carried by said disk and adapted to enter said seats and constructed with projections through which they may be moved in opposition to their springs, bolts through which motion is transmitted to the driven member, an axially movable displacing box having openings which receive the transmitting bolts adapted to engage the projections on the locking bolts to hold them out of engagement with the seats, a driving member having a lost motion driving and displacing connection with the displacing box, a cover for the casing, and a spring interposed between the displacing box and the casing cover.

The foregoing specification signed at Düsseldorf, Germany, this 19th day of December, 1907.

FRIEDRICH HENDLER.

In presence of—

WILHELM FLASCHE,
CLEMENT HECKMANNY.